United States Patent
Brown et al.

(10) Patent No.: US 10,793,291 B2
(45) Date of Patent: Oct. 6, 2020

(54) SYSTEMS AND METHODS FOR CLEANING INTERIOR PORTIONS OF A VEHICLE

(71) Applicant: THE BOEING COMPANY, Chicago, IL (US)

(72) Inventors: Douglas Alan Brown, Edmonds, WA (US); Karen L. Hills, Everett, WA (US)

(73) Assignee: The Boeing Company, Chicago, IL (US)

(*) Notice: Subject to any disclaimer, the term of this patent is extended or adjusted under 35 U.S.C. 154(b) by 229 days.

(21) Appl. No.: 15/175,239

(22) Filed: Jun. 7, 2016

(65) Prior Publication Data

US 2017/0283092 A1    Oct. 5, 2017

Related U.S. Application Data

(60) Provisional application No. 62/315,994, filed on Mar. 31, 2016.

(51) Int. Cl.
*B64F 5/00*  (2017.01)
*B64F 5/30*  (2017.01)
*B64D 11/02* (2006.01)

(52) U.S. Cl.
CPC ............ *B64F 5/30* (2017.01); *B64D 11/02* (2013.01)

(58) Field of Classification Search
None
See application file for complete search history.

(56) References Cited

U.S. PATENT DOCUMENTS

| | | | |
|---|---|---|---|
| 3,969,133 A | 7/1976 | McTighe | |
| 3,995,328 A | 12/1976 | Carolan | |
| 4,063,315 A | 12/1977 | Carolan | |
| 4,597,114 A | 7/1986 | Paterlini | |
| 4,819,276 A | 4/1989 | Stevens | |
| 5,647,074 A | 7/1997 | White, Jr. | |
| 5,857,228 A | 1/1999 | Waltenberger | |
| 5,959,423 A * | 9/1999 | Nakanishi | A47L 11/305 15/319 |
| 2003/0177572 A1 | 9/2003 | Guerin | |
| 2009/0044370 A1* | 2/2009 | Won | A47L 9/106 15/319 |
| 2009/0198380 A1 | 8/2009 | Seegrid | |
| 2014/0115764 A1 | 5/2014 | Cheng | |

(Continued)

FOREIGN PATENT DOCUMENTS

| | | |
|---|---|---|
| CN | 105804188 | 7/2016 |
| JP | 2010017428 A * | 1/2010 |

(Continued)

OTHER PUBLICATIONS

Combined Search and Examination Report for GB1703789.6, dated Aug. 7, 2017.

(Continued)

*Primary Examiner* — Eric W Golightly
(74) *Attorney, Agent, or Firm* — The Small Patent Law Group LLC; Joseph M. Butscher

(57) ABSTRACT

A vehicle includes an internal cabin, and an autonomous cleaning system located within an interior chamber of the internal cabin. The autonomous cleaning system includes a cleaning robot configured to clean a portion of the interior chamber.

22 Claims, 9 Drawing Sheets

(56) References Cited

U.S. PATENT DOCUMENTS

2014/0215735 A1    8/2014  Gilbert, Jr. et al.
2015/0013063 A1*  1/2015  Boodaghians ....... B61D 35/007
                                                                4/663

FOREIGN PATENT DOCUMENTS

KR        20150073726 A  *  7/2015
WO    WO 2014036217      3/2014

OTHER PUBLICATIONS

Examination Report for GB1703789.6, dated Mar. 8, 2019.
Examination Report for GB1703789.6, dated Jun. 27, 2019.
Examination Report for GB1703789.6, dated Oct. 15, 2019.

* cited by examiner

SYSTEMS AND METHODS FOR CLEANING INTERIOR PORTIONS OF A VEHICLE

RELATED APPLICATIONS

This application relates to and claims priority benefits from U.S. Provisional Patent Application No. 62/315,994, entitled "Systems and Methods for Cleaning Interior Portions of a Vehicle," filed Mar. 31, 2016, which is hereby incorporated by reference in its entirety.

FIELD OF THE DISCLOSURE

Embodiments of the present disclosure generally relate to systems and methods for cleaning interior portions of a vehicle, such as a commercial aircraft.

BACKGROUND OF THE DISCLOSURE

Commercial aircraft are used to transport passengers between various locations. During a flight—particularly a trans-oceanic or other long haul flight—passengers are typically confined within certain areas (for example, cabins) of an aircraft. Various individuals (such as passengers, pilots, flight attendants, and the like) use certain internal portions of an aircraft during a flight. For example, numerous individuals may use a lavatory within an internal cabin during a flight.

As can be appreciated, with each use, the cleanliness of a lavatory onboard an aircraft may be compromised. Individuals onboard may be sensitive to health risks presented by a frequently-used lavatory onboard an aircraft. Indeed, as each individual uses a lavatory onboard an aircraft, the likelihood of germs and bacteria therein increases.

Typically, an aircraft lavatory is cleaned between flights. For example, maintenance or cleaning personnel board the aircraft on the ground before and/or after a flight to clean the lavatory. However, during a flight, the lavatory is typically not cleaned, despite the fact that numerous individuals may use the lavatory during the flight. While flight attendants may be able to clean the lavatory, they are usually preoccupied with other duties during the flight. As such, cleaning the lavatory may not be a top priority for flight attendants during a flight or even between flights.

Consequently, the cleanliness of lavatories onboard an aircraft may be compromised, particularly during flights. In general, during a flight, a lavatory onboard an aircraft may become dirty, wet, smelly, and the like due to use by individuals onboard the aircraft during the flight. As such, a flight experience for individuals onboard the aircraft may be negatively impacted.

SUMMARY OF THE DISCLOSURE

A need exists for a system and a method for cleaning interior spaces of an aircraft. A need exists for a system and a method for effectively and efficiently cleaning a lavatory onboard an aircraft, particularly during a flight.

With those needs in mind, certain embodiments of the present disclosure provide a vehicle, such as an aircraft that includes an internal cabin, and an autonomous cleaning system located within an interior chamber of the internal cabin. The autonomous cleaning system includes a cleaning robot configured to clean a portion of the interior chamber. In at least one embodiment, the interior chamber is or otherwise includes a lavatory.

The autonomous cleaning system may also include a docking station within the interior chamber. The cleaning robot is configured to be housed within the docking station. The cleaning robot is configured to be deployed from the docking station during a cleaning cycle. The docking station may include a charger that is configured to charge a battery of the cleaning robot when the cleaning robot is housed within the docking station.

A presence sensor may be configured to detect a presence of an individual within the interior chamber. In at least one embodiment, the cleaning robot is deployed to clean the portion of the interior chamber when the interior chamber is unoccupied.

The cleaning robot may include a debris collector configured to collect debris from the interior chamber during a cleaning cycle, an agitator configured to agitate the portion of the interior chamber during a cleaning cycle, a dispenser in fluid communication with a fluid reservoir (wherein the dispenser is configured to dispense fluid onto the portion of the interior chamber during a cleaning cycle), and/or an ultraviolet light that is configured to irradiate the portion of the interior chamber with ultraviolet light during a cleaning cycle. In at least one embodiment, the cleaning robot includes the fluid reservoir.

The cleaning robot may include a conveyance sub-system and a navigation sub-system. The conveyance sub-system is configured to move the cleaning robot within the interior chamber based on signals received from the navigation sub-system.

Certain embodiments of the present disclosure provide a method of cleaning an interior chamber of an internal cabin of an aircraft. The method includes locating an autonomous cleaning system within the interior chamber of the internal cabin, deploying a cleaning robot within the interior chamber during a cleaning cycle, and cleaning a portion of the interior chamber with the cleaning robot during the cleaning cycle.

The method may include housing the cleaning robot within a docking station before and after the cleaning cycle. The method may also include charging a battery of the cleaning robot within the docking station.

The method may include detecting a presence of an individual within the interior chamber. The deploying and cleaning operations may occur when the interior chamber is unoccupied.

The cleaning operation may include collecting debris from the interior chamber during a cleaning cycle, agitating the portion of the interior chamber during the cleaning cycle, dispensing fluid onto the portion of the interior chamber during the cleaning cycle, and/or irradiating the portion of the interior chamber with ultraviolet light during the cleaning cycle.

The method may also include moving the cleaning robot within the interior chamber based on signals received from a navigation sub-system.

DETAILED DESCRIPTION OF THE DISCLOSURE

Figure 1:
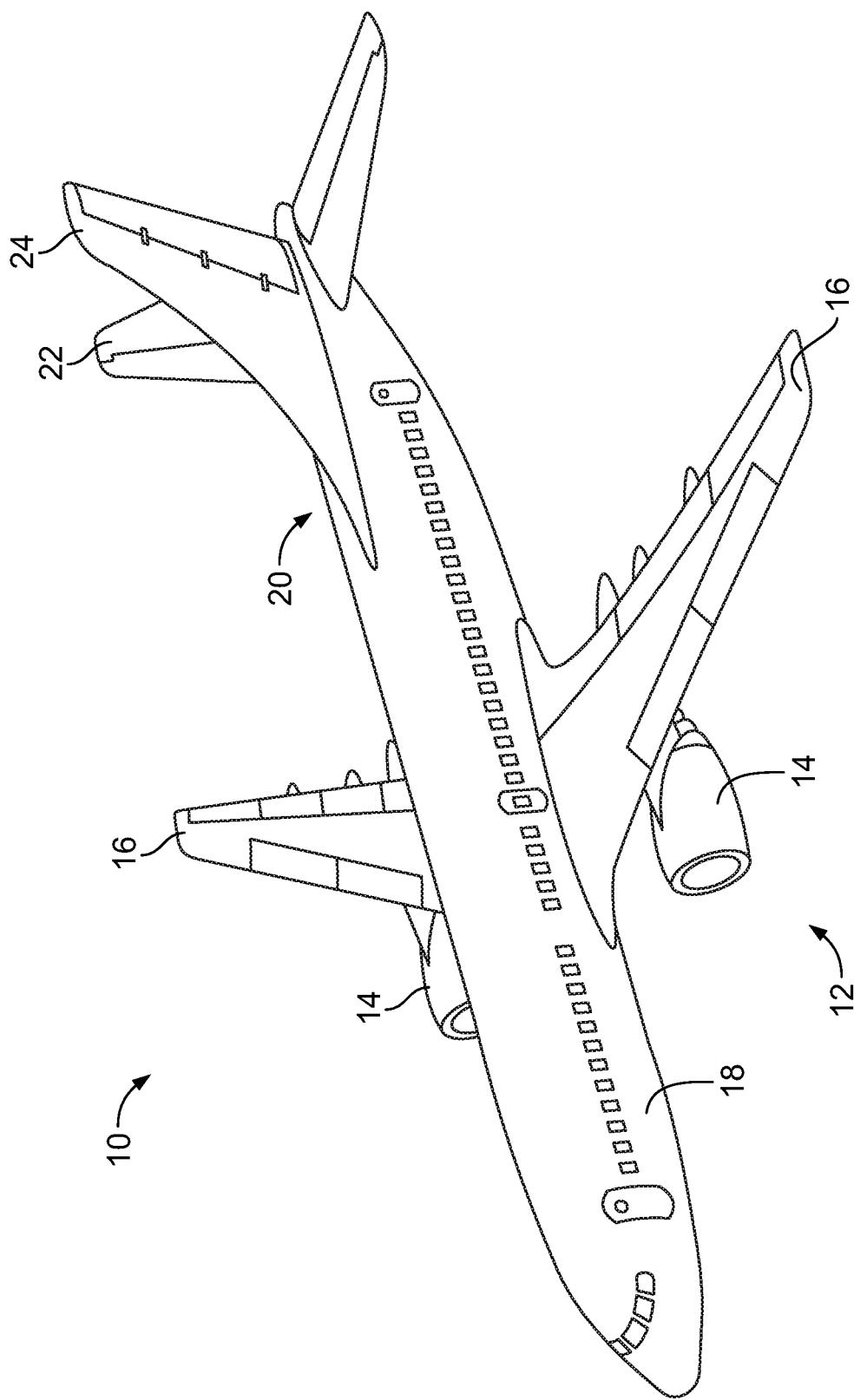
FIG. 1 illustrates a perspective top view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods that are configured to maintain a clean and sanitary environment onboard interior chambers or areas of a vehicle. In at least one embodiment, a system and method includes a cleaning robot that is configured to clean an interior chamber (such as a lavatory, galley, or the like) onboard a vehicle. The cleaning robot is configured to scrub, sweep, irradiate, and/or vacuum one or more portions of the interior chamber.

Certain embodiments of the present disclosure provide systems and methods for automatically cleaning interior spaces of an aircraft. For example, the systems and methods may be used to automatically clean lavatories onboard an aircraft. The systems and methods may be used to clean the interior spaces during a flight. In other embodiments, the systems and methods may be used to clean interior spaces of other vehicles, such as trains, buses, and/or the like.

In at least one embodiment, an autonomous cleaning system and method includes a cleaning robot that is configured to autonomously clean (for example, scrub, sweep, irradiate, and/or vacuum) portions of an interior chamber of a vehicle (such as a lavatory of an aircraft). For example, the cleaning robot may be deployed from a docking station within a lavatory when the lavatory is unoccupied. The cleaning robot may be hidden from view (such as by being housed within the docking station) when the lavatory is occupied.

In at least one embodiment, the cleaning robot may include an ultraviolet light that is configured to emit ultraviolet light that disinfects an interior chamber (such as a lavatory). In at least one other embodiment, the cleaning robot may not include the ultraviolet light. For example, the interior chamber may include a separate and distinct ultraviolet light. In at least one other embodiment, the interior chamber may not include an ultraviolet light.

Embodiments of the present disclosure provide systems and methods that are configured to clean floors of interior chambers of a vehicle or fixed structures (such as lavatories within buildings). The systems and methods may be configured to clean and dry floors within an interior chamber, thereby reducing the risks of individuals slipping on wet floors. Embodiments of the present disclosure provide systems and methods that are configured to autonomously clean and sterilize surfaces (such as floors) of interior chambers.

Certain embodiments of the present disclosure provide an autonomous cleaning system that includes a cleaning device (such as a cleaning robot). The cleaning device is configured to be stowed within a designated space, such as within a docking station, closet, and/or the like. The cleaning device is configured to clean an interior chamber, such as a lavatory. The cleaning device may be selectively programmable, and may be configured for use when the internal space is unoccupied by an individual.

Certain embodiments of the present disclosure provide a method of cleaning an interior chamber (such as a lavatory) that includes closing a door of the interior chamber, determining that the interior chamber is unoccupied, and deploying an autonomous cleaning device (such as a cleaning robot) to clean the interior chamber. The cleaning device may include a dispenser, a mechanical agitator (for example, a scrubber), and/or a vacuum. The method may also include docking the autonomous cleaning device in a storage space.

FIG. 1 illustrates a perspective top view of an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may include a cockpit, one or more work sections (for example, galleys, personnel carry-on baggage areas, and the like), one or more passenger sections (for example, first class, business class, and coach sections), and an aft section in which an aft rest area assembly may be positioned. Each of the sections may be separated by a cabin transition area, which may include one or more class divider assemblies. Overhead stowage bin assemblies may be positioned throughout the internal cabin.

The internal cabin includes various interior chambers, such as monuments. The monuments may include lavatories, galleys, defined passenger seating stations, and/or the like. Embodiments of the present disclosure provide systems and methods that are configured to autonomously clean one or more interior chambers within the internal cabin.

Alternatively, instead of an aircraft, embodiments of the present disclosure may be used with various other vehicles, such as automobiles, buses, locomotives and train cars, watercraft, spacecraft, and the like. Further, embodiments of the present disclosure may be used with respect to fixed structures, such as commercial and residential buildings.

Figure 2A:
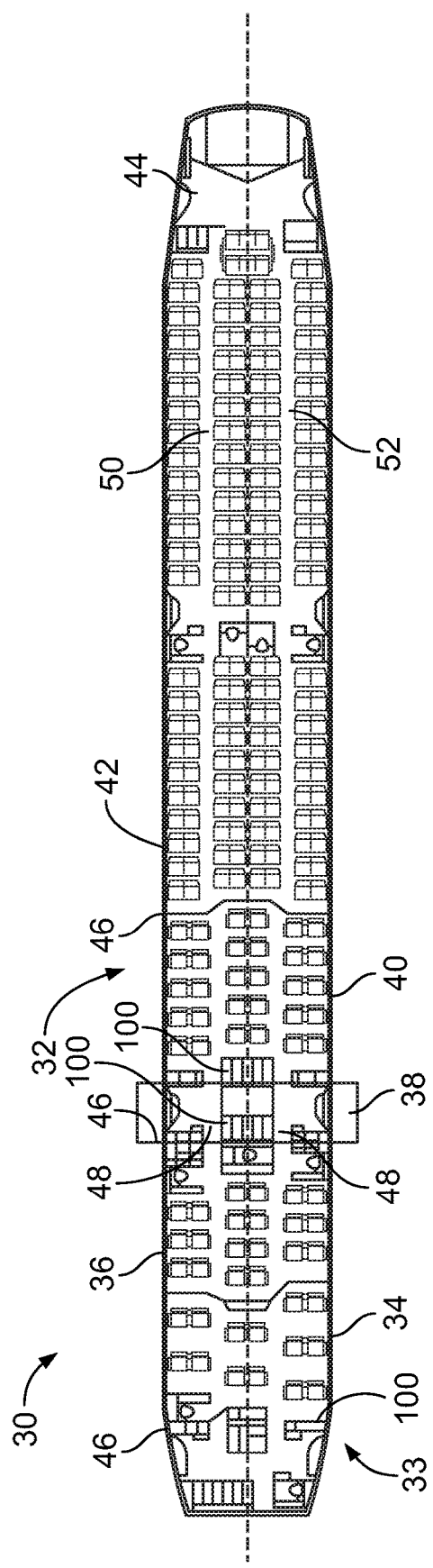
FIG. 2A illustrates a top plan view of an internal cabin of an aircraft, according to an embodiment of the present disclosure.

FIG. 2A illustrates a top plan view of an internal cabin 30 of an aircraft, according to an embodiment of the present disclosure. The internal cabin 30 may be within a fuselage 32 of the aircraft. For example, one or more fuselage walls may define the internal cabin 30. The internal cabin 30 includes multiple sections, including a front section 33, a first class section 34 (or first class suites, cabins, for example), a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46, which may include class divider assemblies between aisles 48.

As shown in FIG. 2A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

One or more autonomous cleaning systems 100 may be located within the internal cabin 30. For example, an autonomous cleaning system 100 may be located within a lavatory of the first class section 34. Additionally, or alternatively, an autonomous cleaning system 100 may be located within a front galley station 38. Additionally, or alternatively, an autonomous cleaning system 100 may be located within the expanded economy or coach section 40. In short, cleaning systems 100 may be located throughout the internal cabin 30.

In operation, each autonomous cleaning system 100 is configured to autonomously clean (for example, sweep, scrub, vacuum, sterilize, and/or the like) an interior chamber in which the particular autonomous cleaning system 100 is located. The autonomous cleaning system 100 may be deployed when the interior chamber is unoccupied by an individual.

Figure 2B:
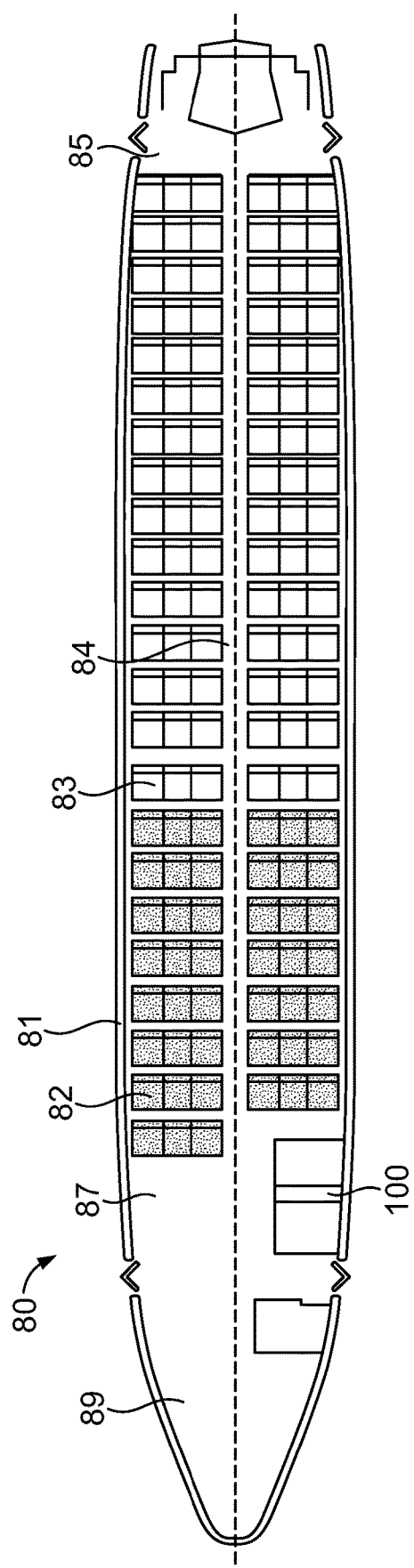
FIG. 2B illustrates a top plan view of an internal cabin of an aircraft, according to an embodiment of the present disclosure.

FIG. 2B illustrates a top plan view of an internal cabin 80 of an aircraft, according to an embodiment of the present disclosure. The internal cabin 80 may be within a fuselage 81 of the aircraft. For example, one or more fuselage walls may define the internal cabin 80. The internal cabin 80 includes multiple sections, including a main cabin 82 having passenger seats 83, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

An autonomous cleaning system 100 may be located within a lavatory of the main cabin 82 at a fore section 87 proximate to a cockpit area 89. Additional autonomous cleaning systems 100 may be located throughout the main cabin 82.

Figure 3:
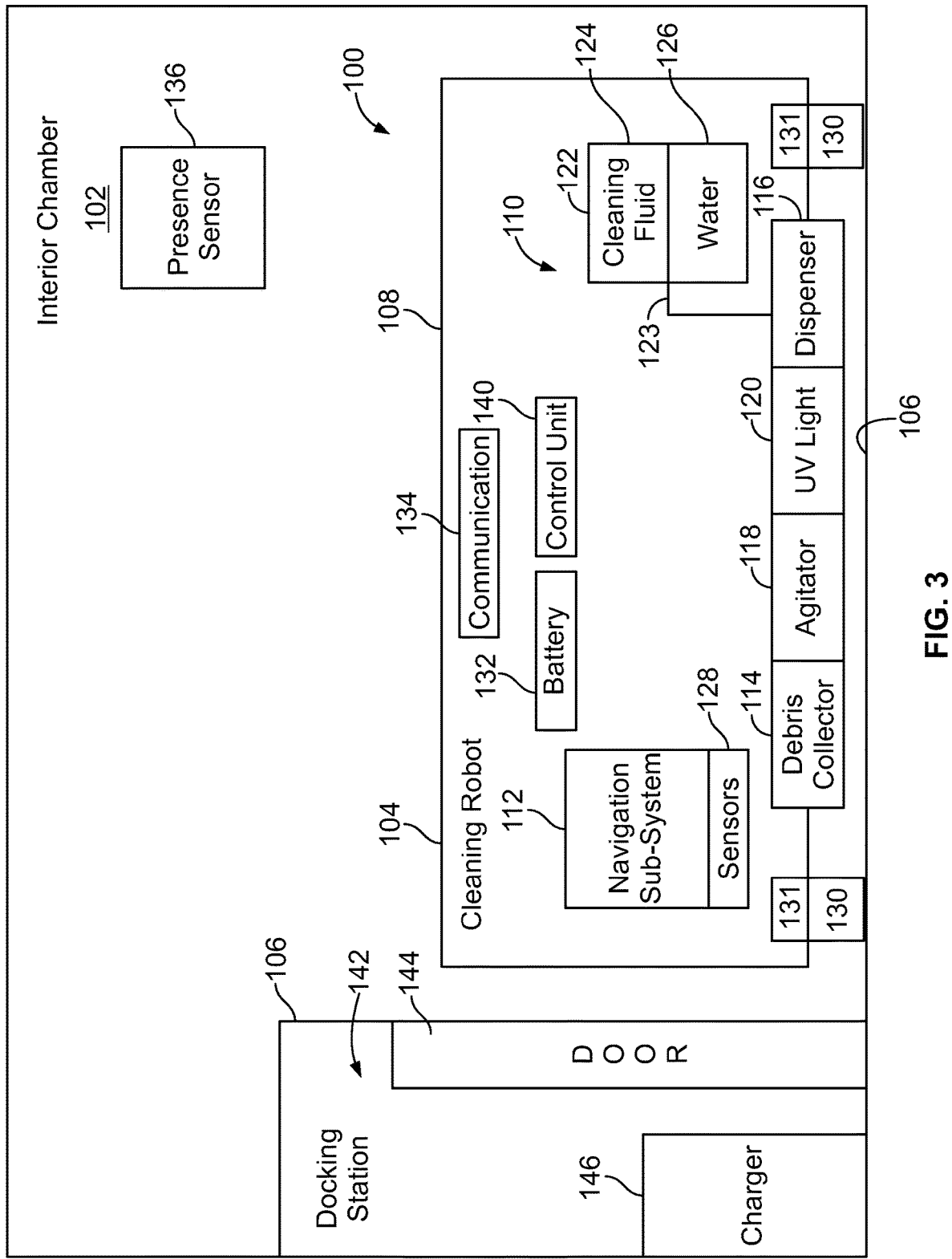
FIG. 3 illustrates a schematic diagram of an autonomous cleaning system within an interior chamber, according to an embodiment of the present disclosure.

FIG. 3 illustrates a schematic diagram of the autonomous cleaning system 100 within an interior chamber 102, according to an embodiment of the present disclosure. It is to be understood that the items shown in FIG. 3 are not drawn to scale. The interior chamber 102 may be a lavatory, a galley, a station, or the like. The interior chamber 102 may be onboard a vehicle, such as the aircraft 10.

The autonomous cleaning system 100 includes a cleaning device, such as a cleaning robot 104 that is configured to autonomously clean portions of the interior chamber 102. For example, the cleaning robot 104 is configured to clean a floor 106 of the interior chamber.

The cleaning robot 104 may be configured to be deployed to clean the interior chamber 102 when unoccupied by individuals (such as passengers onboard an aircraft). When the cleaning robot 104 is not in use (such as when the interior chamber 102 is occupied by an individual), the cleaning robot 104 may be stored within a storage structure, such as a docking station 106.

The cleaning robot 104 includes a main housing 108 that houses a cleaning sub-system 110 and a navigation sub-system 112. Alternatively, the cleaning robot 104 may not include the navigation sub-system 112. The cleaning sub-system 100 may include a debris collector 114 (such as a broom, vacuum, and/or the like), a fluid dispenser 116, an agitator 118 (such as a scrubber, or the like), and one or more ultraviolet (UV) lights 120. Optionally, the cleaning sub-system 100 may not include each of the debris collector 114, the fluid dispenser 116, the agitator 118, and the UV light 120. For example, in at least one embodiment, the cleaning sub-system 100 may not include the UV light 120. The UV light 120 may be separately located within the interior chamber 102. In at least one other embodiment, neither the interior chamber 102, nor the cleaning robot 104 includes a UV light. In at least one other embodiment, the cleaning sub-system 100 may include only the UV light 120.

The debris collector 114 is configured to collect debris that may be on the floor 106. For example, the debris collector 114 may include a vacuum that is configured to suction the debris into a debris collection storage vessel onboard the cleaning robot 104 and/or coupled to the cleaning robot 104 through one or more flexible tubes, hoses, ducts, and/or the like. In at least one other embodiment, the debris collector may include one or more brushes, brooms, and, or the like that are configured to move the debris into a debris collection storage vessel or area.

The fluid dispenser 116 may include one or more nozzles or the like that are configured to dispense fluid (such as cleaning fluids, water, and/or the like) onto the floor 106. The fluid dispenser 116 is coupled to a fluid reservoir 122 through one or more conduits 123 (such as tubes, pipes, and/or the like). The fluid reservoir 122 may include a cleaning fluid chamber 124 and/or a water chamber 126. The dispenser 116 receives cleaning fluid (such as detergent, disinfectant cleaner, and/or or the like) from the cleaning fluid chamber 124 and water from the water chamber 126 via the conduit(s) 123.

As shown, the fluid reservoir 122 may be contained within the cleaning robot 104. Optionally, the cleaning robot 104 may not include the fluid reservoir 122. Instead, the cleaning robot 104 may be in communication with a separate and distinct fluid reservoir 122 within or outside of the interior chamber 102 through one or more fluid conduits. For example, the cleaning robot 104 may be tethered to one or more sources of water, cleaning fluid, and or waste removal through one or more flexible hoses and/or cables.

In at least one embodiment, the cleaning robot 104 and/or the docking station 106 may include one or more interfaces that are configured to couple to a lavatory water supply and waste disposal system when the cleaning robot 104 is docked within the docking station 106. As such, the cleaning robot 104 may be replenished with water and/or cleaning fluid when docked in the docking station 106 and coupled to one or more remote sources of water and/or cleaning fluid via the interface(s). Further, the cleaning robot 104 may include a waste storage device (such as a tank) that may be emptied when docked in the docking station 106 and coupled to the waste disposal system via the interface(s). In at least one embodiment, valves (such as servo-driven valves) on or within plumbing in or coupled to the interior chamber 102 may be actuated to allow water to be added to the water reservoir 126, and waste fluid to be removed. Further, waste fluid may be drained through a gray water system within or connected to the interior chamber 102. A portion of the agitator 118 (such as a rotatable brush) may be removed in order to remove solid debris that may be within or on the agitator 118.

In at least one embodiment, the cleaning fluid reservoir 124 may be configured to receive and removably retain cleaning fluid cartridges, which may be removed and discarded after use. The cartridges may be replaced during a flight, for example. In at least one other embodiment, the cleaning fluid reservoir 124 is configured to be directly replenished with cleaning fluid, instead of cartridges that contain cleaning fluid.

The fluid dispenser 116 is configured to deposit fluid, such as cleaning fluid and/or water, onto the floor 106. The agitator 118 is configured to agitate the cleaning fluid and/or water to sanitize the floor 106. The agitator 118 may include a scrubber, for example.

The UV light 120 is configured to irradiate or otherwise emit UV light onto the floor 106 in order to disinfect, sanitize, clean, or otherwise rid the floor of germs, bacteria, microbes, and/or the like. As noted, the UV light 120 may alternatively not be positioned onboard the cleaning robot 104.

The navigation sub-system 112 is configured to determine a position of the cleaning robot 104 within the interior chamber 102 and allow the cleaning robot 104 to be moved therethrough. The navigation system 112 may include one or more position sensors 128, such as infrared sensors, ultrasound sensors, and/or the like that are configured to emit signals (such as light signals, ultrasonic signals, and/or the like) into structural features of the interior chamber 102, and receive feedback based on the emitted signals to determine a position of the cleaning robot 104 in relation to various structural features within the interior chamber 102. Alternatively, the navigation sub-system 112 may be configured to analyze wheel rotation and direction to determine a position within the interior chamber 102. In at least one other embodiment, an inductive wire below the floor or embedded in the floor may be used to provide directional and control information. Alternatively, the cleaning robot 104 may not include the navigation sub-system.

One or more conveyors 130 may extend downwardly from the housing 108 and contact the floor 106. The conveyors 130 are part of a conveyance sub-system 131 that may include motors, brakes, wheels, tracks, rails, and/or the like that are configured to move the cleaning robot 104 on the floor via the conveyors 130. The conveyors 130 may include wheels, rollers, moveable legs, tracks, and/or the like. The conveyors 130 are configured to allow the cleaning robot 104 to move on or otherwise in relation to the floor 106 within the interior chamber 102.

The housing 108 may also house one or more batteries 132 that are configured to provide power to operate the cleaning robot 104. Alternatively, instead of batteries 132, the cleaning robot 104 may be connected to a source of power within or outside of the interior chamber 102, such as through one or more cables.

The cleaning robot 104 may also include a communication device 134, such as a transceiver, antenna, and/or the like. The communication device 134 is in communication with a remote system that may be configured to trigger, deploy, or otherwise activate the cleaning robot 104. For example, the communication device 134 may be in communication with a presence sensor 136 within the interior chamber 102 that indicates whether or not an individual is within the interior chamber 102. The presence sensor 136 may be or include one or more magnetic switches, motion sensors (such as infrared motion sensors), heat sensors, and/or the like that are configured to detect whether an individual is within the interior chamber 102. For example, the presence sensor 136 may be a magnetic switch coupled to a door of the interior chamber 102. In at least one other embodiment, the cleaning robot 104 may not include a separate and distinct communication device, but may be in communication with the remote system (such as the presence sensor 136, control panel, handheld device, and/or the like) through one or more wired or wireless connections.

The cleaning robot 104 includes a robot control unit 140 that is configured to control operation of the cleaning robot 104. For example, the control unit 140 is in communication with the cleaning sub-system 110, the navigation sub-system 112, and the conveyance sub-system 131 in order to move the cleaning robot 104 within the interior chamber 102 to clean the floor 106 and/or other portions (for example, walls) of the interior chamber 102. Alternatively, the control unit 140 may be remotely located from the cleaning robot 104, and may be in communication with the components thereof through one or more wired or wireless connections.

As noted, the cleaning robot 104 is configured to be deployed when the interior chamber 102 is unoccupied. The control unit 140 determines whether the interior chamber 102 is occupied or unoccupied through signals received from the presence sensor 136. When the interior chamber 102 is occupied, the cleaning robot 104 may be stored within the docking station 106. For example, after a cleaning operation is completed, the control unit 140 may move the cleaning robot 104 into an area 142 within the docking station 106 through a door 144 and/or opening, for example. After the cleaning robot 104 is positioned within the area 142, the door 144 closes. For example, the door 144 may be secured to the docking station 106 through a hinge (not shown in FIG. 1) that allows the cleaning robot 104 to open the door by moving into the door 144, with the door automatically closing via the hinge after the cleaning robot 104 no longer contacts the door 144.

The door 144 may be secured in a closed position through a latch (not shown in FIG. 3). The latch may be an RFID latch that is configured to be opened in response to an RFID key or chip, for example.

In at least one embodiment, the door 144 may be configured to be opened when a compatible RFID chip is in close proximity thereto. For example, the cleaning robot 104 may include an RFID chip that allows the door 144 to be opened when the cleaning robot 144 sends a door opening signal, such as through the control unit 140.

The area 142 within the docking station 106 may include a charger 146 that couples to a port of the cleaning robot 104 when the cleaning robot 104 is within the docking station 106. The charger 146 couples to the battery 132 through one or more wired connections that allow the charger 146 to charge the battery 132.

In operation, the presence sensor 136 detects the presence of an individual within the interior chamber 102. If an individual is within the interior chamber 102, the cleaning robot 104 is stowed within the docking station 106, and may be hidden from view within the area 142. Upon the individual leaving the interior chamber 102, the control unit 140 detects that the interior chamber 102 is unoccupied based on signals received from the presence sensor 136. In at least one other embodiment, instead of a presence sensor, the control unit 140 may be in communication with a control panel within or outside of the interior chamber. The control panel may include activation members (such as buttons, keys, or the like) that are configured to be engaged by an individual (such as a flight attendant) to activate a cleaning cycle of the cleaning robot 104.

When the interior chamber 102 is unoccupied, the control unit 140 may initiate a cleaning cycle of the cleaning robot 104. During the cleaning cycle, the control unit 140 communicates with the navigation sub-system 112 and the conveyance sub-system 131 to maneuver the cleaning robot 104 within the interior chamber 102. The control unit 140 operates the cleaning sub-system 110 during the cleaning cycle to clean areas within the interior chamber 102. For example, the control unit 140 may operate the cleaning sub-system 110 to clean (for example, sweep, vacuum, scrub, disinfect, sanitize, and/or the like) the floor 106. The control unit 140 may operate the debris collector 114 to remove debris from the floor 106. The control unit 140 may operate the dispenser 116 to deposit fluid (such as cleaning agents, water, and/or the like) onto the floor 106. The control unit 140 may operate the agitator 118 to agitate (for example, scrub) the fluid on the floor, for example. The control unit 140 may then operate the debris collector 114 to collect excess fluid from the floor 106. In at least one other embodiment, the control unit 140 may be in communication with a dryer (such as a fan, blower, or the like) that is configured to dry the floor 106. The control unit 140 may also operate the UV light 120 to irradiate the floor with UV light, thereby ridding the floor 106 of germs, bacteria, microbes, and/or the like.

After the cleaning cycle is complete, the cleaning robot 104 returns to the docking station 106. Also, if an individual enters the interior chamber 102 during the cleaning cycle, the cleaning robot 104 may suspend the cleaning cycle and return to the docking station until the individual leaves the interior chamber 102. In at least one other embodiment, the cleaning robot 104 may operate to clean the interior chamber 102 while an individual is within the interior chamber 102.

As described above, the control unit 140 controls operation of the cleaning robot 104 to clean the interior chamber 102 during a cleaning cycle. As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 140 may be or include one or more processors that are configured to control operation of the autonomous cleaning system 100.

The control unit 140 is configured to execute a set of instructions that are stored in one or more storage elements (such as one or more memories), in order to process data. For example, the control unit 140 may include or be coupled to one or more memories. The storage elements may also store data or other information as desired or needed. The storage elements may be in the form of an information source or a physical memory element within a processing machine.

The set of instructions may include various commands that instruct the control unit 140 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 140. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 140 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As described above, the autonomous cleaning system 100 may be housed within the interior chamber 102 (such as a lavatory of an aircraft). The autonomous cleaning system 100 includes the cleaning robot 104 that is configured to be deployed when the interior chamber 102 is unoccupied. The control unit 104 operates the cleaning robot 104 to move throughout the interior chamber 102 and clean surfaces (such as the floor 106) therein during the cleaning cycle, and return to the docking station 106 when the cleaning cycle is completed, and/or upon an individual entering the interior chamber 102.

In at least one embodiment, the cleaning robot 104 is deployed to clean the interior chamber 102 (such as by the control unit 140) after an individual exits the interior chamber 102. In at least one embodiment, the cleaning robot 104 is deployed to clean the interior chamber 102 based on a predetermined schedule, such as may be stored within a memory of the control unit 140. In at least one other embodiment, the cleaning robot 104 may be deployed to clean the interior chamber 102 based on a command received from a command/control panel that is in communication with the control unit 140. The command/control panel includes one or more activation members (such as buttons, keys, touchscreens, and/or the like), which may be on the docking station 106, within the interior chamber 102, and/or outside of the interior chamber 102 (such as within a flight attendant station).

The control unit 140 may send status signals to remote devices (such as handheld devices, computers, and/or the like) through the communication device 134, for example. The status signals may provide information to individuals (such as flight attendants) as to the state of the cleaning robot (for example, in use, stored within the docking station, diagnostic information, and/or the like).

Figure 4:
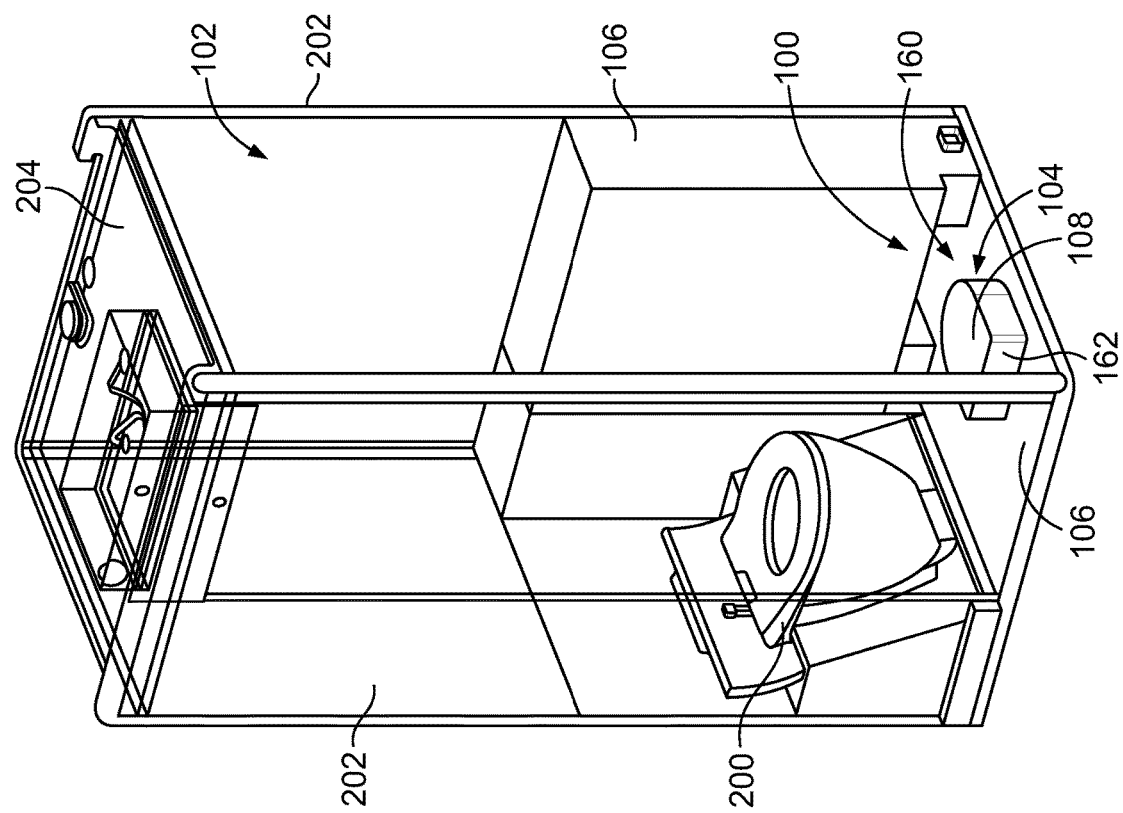
FIG. 4 illustrates a perspective internal view of an autonomous cleaning system within an interior chamber, according to an embodiment of the present disclosure.

FIG. 4 illustrates a perspective internal view of the autonomous cleaning system 100 within the interior chamber 102, according to an embodiment of the present disclosure. As shown, the interior chamber 102 may be a lavatory, having a toilet 200 and sink (not shown). The lavatory may be a lavatory module 202 having the floor 106 connected to upstanding walls 202 and a ceiling 204 that define the interior chamber 102. The lavatory module 202 is configured to be secured within an internal cabin of an aircraft, for example. The cleaning robot 104 is configured to be guided over the floor 106, as described above. In this manner, the cleaning robot 104 may clean the floor 106.

As shown, the docking station 106 may include a cavity 160 into which the cleaning robot 104 is docked when not in use. In the embodiment shown in FIG. 4, the docking station 106 may not include a separate and distinct door. Instead, a rear wall 162 of the housing 108 of the cleaning robot 104 may provide a cover for the cavity 160 that conceals the cleaning robot 104 therein when not deployed.

Figure 5:
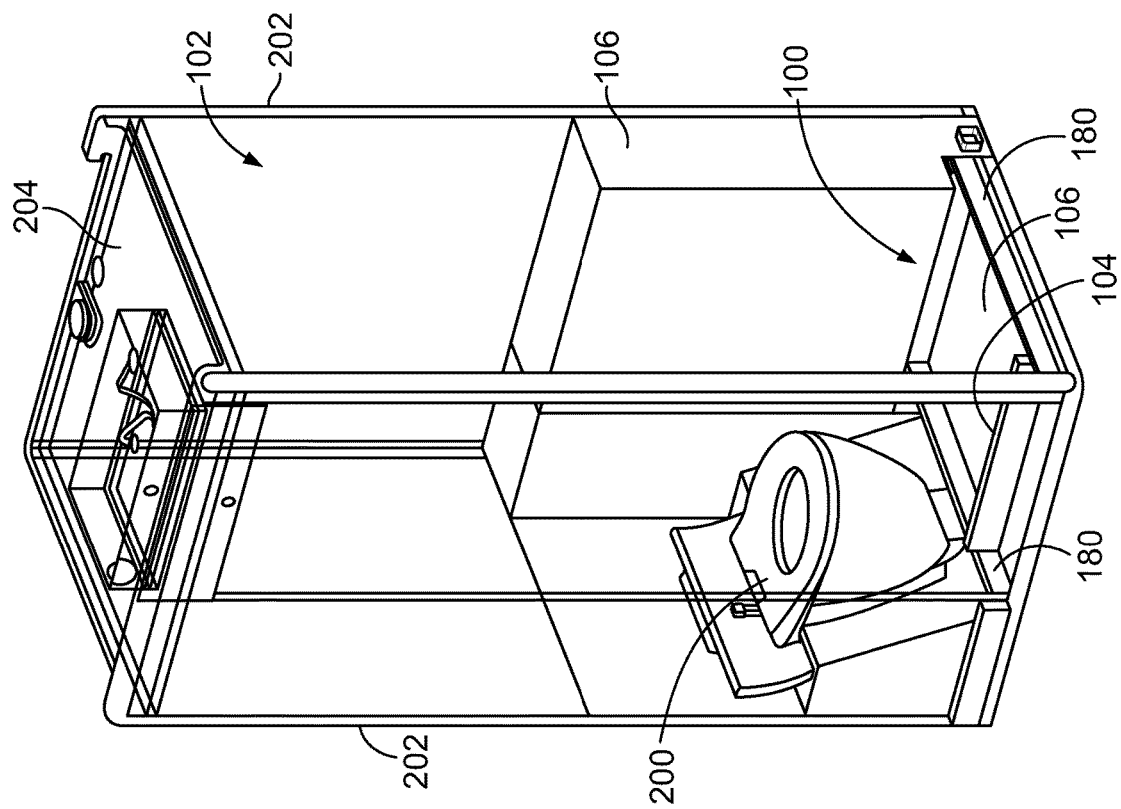
FIG. 5 illustrates a perspective internal view of an autonomous cleaning system within an interior chamber, according to an embodiment of the present disclosure.

FIG. 5 illustrates a perspective internal view of the autonomous cleaning system 100 within the interior chamber 102, according to an embodiment of the present disclosure. In this embodiment, the cleaning robot 104 may be moveably secured to parallel tracks 180 (such as rails, beams, or the like), which provide the conveyors 130. The cleaning robot 104 may outwardly deploy from the docking station 106 and translate along the tracks 180. During such motion, the cleaning robot 104 cleans the floor 106.

The tracks 180 may be embedded within or otherwise secured to the walls 202 and/or the floor 106. Embedded tracks 180 reduce the profile of the tracks 180, and therefore reduce aesthetic effects thereof.

The cleaning robot 102 may be driven through one or more of a rack and pinion, lead screw, timing belt, one or more pulleys, one or more cables, and/or the like. A water supply, vacuum hoses, and/or the like may be enclosed within side tracks that are within or separate and distinct from the tracks 180. In at least one embodiment, the cleaning robot 104 may be a bar that may be stowed within the docking station 106 when not in use.

Instead of parallel tracks 180, the autonomous cleaning system 100 may alternatively include a single track that moveably retains the cleaning robot 104. The cleaning robot 104 may connect to a cantilevered translation carriage that moveably couples the cleaning robot 104 to the track. In at least one other embodiment, the autonomous cleaning system 100 may not include any tracks. Instead, the cleaning robot 104 may pivotally move in relation to a fixed pivot point. The pivot point may be located so that the cleaning robot 104, in the form of a cleaning bar, covers as much floor space as possible during a cleaning cycle.

Figure 11:
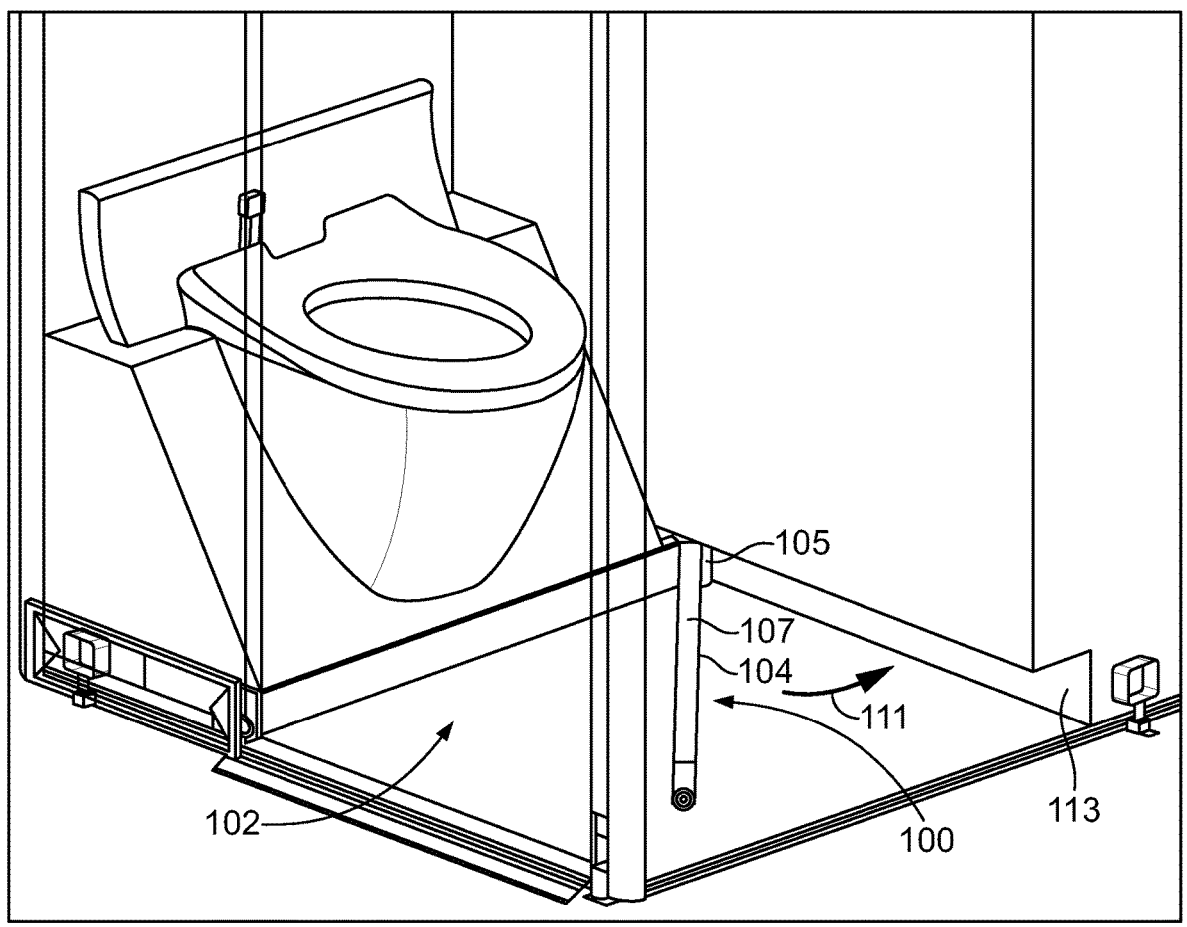
FIG. 11 illustrates a perspective internal view of an autonomous cleaning system within an interior chamber, according to an embodiment of the present disclosure.

FIG. 11 illustrates a perspective internal view of the autonomous cleaning system 100 within the interior chamber 102, according to an embodiment of the present disclosure. In this embodiment, the cleaning robot 104 may pivotally move in relation to a fixed pivot point 105, such as a pivot or hinge axle located within the interior chamber 102. The cleaning robot 104, in the form of a cleaning bar 107, covers as much floor space as possible during a cleaning cycle. After use, the cleaning bar 107 is pivoted about an axis of the pivot point 105 in the direction of arc 111 to a position underneath a structure 109 within the interior chamber 102. The structure 109 (such as a sink, cabinet, or the like) may be include a recessed area 113 into which the cleaning robot 104 is stowed when not in use.

Figure 12:
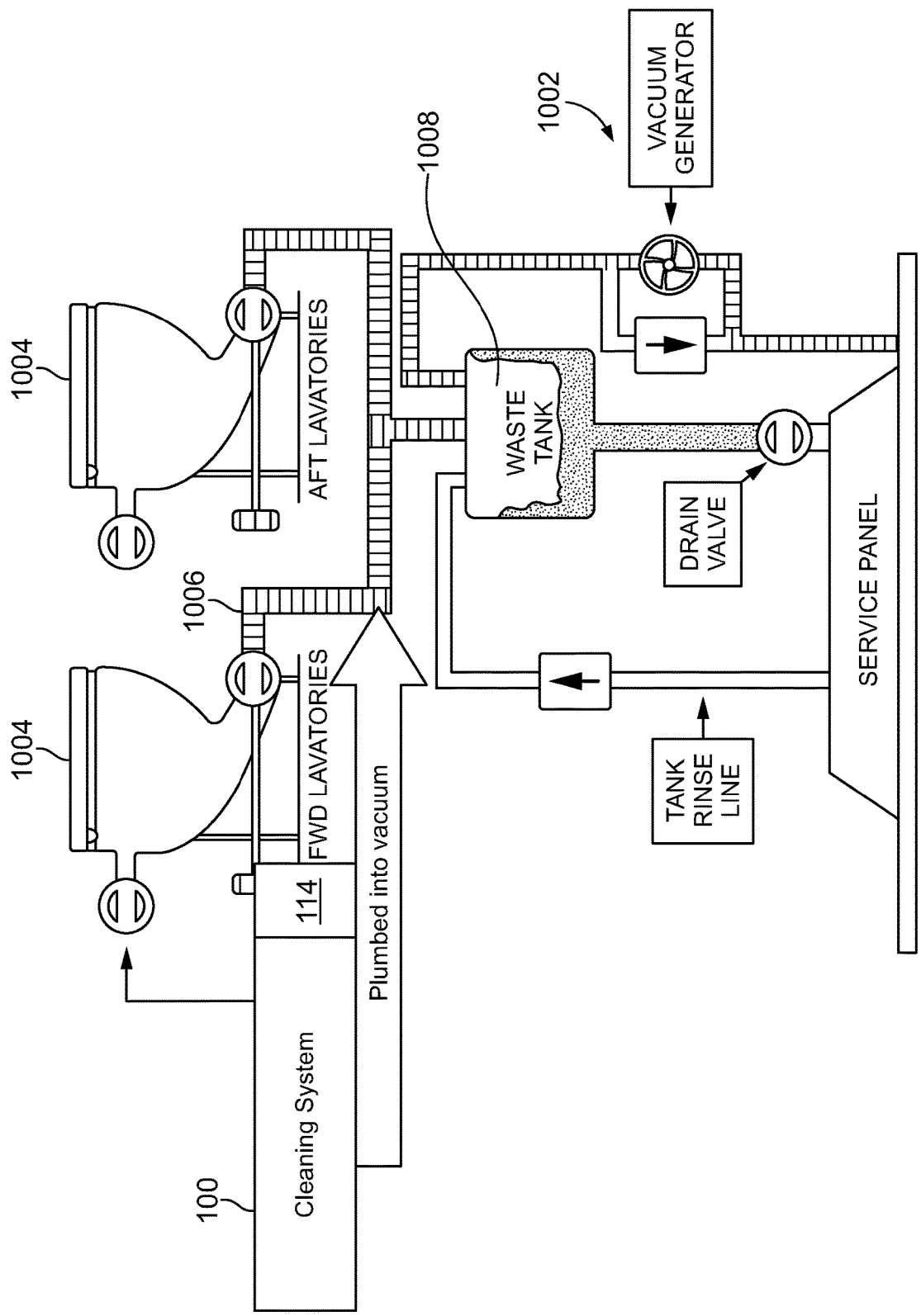
FIG. 12 illustrates a schematic diagram of an autonomous cleaning system coupled to a vacuum system, according to an embodiment of the present disclosure.

FIG. 12 illustrates a schematic diagram of the autonomous cleaning system 100 coupled to a vacuum system 1002, according to an embodiment of the present disclosure. The autonomous cleaning system 100 and the vacuum system 1002 may be onboard a vehicle, such as an aircraft. The debris collector 114 of the autonomous cleaning system 100 is or otherwise includes a vacuum that is coupled to the vacuum system 1002. The vacuum system 1002 is operatively coupled to one or more toilets 1004. The vacuum system 1002 may be secured within a portion of a vehicle, such as within a fuselage of an aircraft.

The debris collector 114 may be fluidly connected to one or more fluid-conveying conduits 1006 that are connected to the toilet(s) 1004 and the vacuum system 1002. For example, a vacuum port of the debris collector 114 is fluidly coupled to the conduit(s) 1006. Accordingly, when the vacuum system 1002 is activated (that is, when the vacuum system 1002 generates a vacuum or suction force through the conduits 1006), the ensuing vacuum or suction force draws liquid on and/or within the debris collector 114 or debris storage vessel therein into the conduit(s) 1006 and into a waste tank 1008.

The vacuum system 1002 may be activated when a toilet 1004 adjacent or otherwise proximate to the autonomous cleaning system 100 is flushed. In at least one other embodiment, the vacuum system 1002 may be activated when a lavatory in which the toilet 1004 is located is unoccupied.

Figure 6:
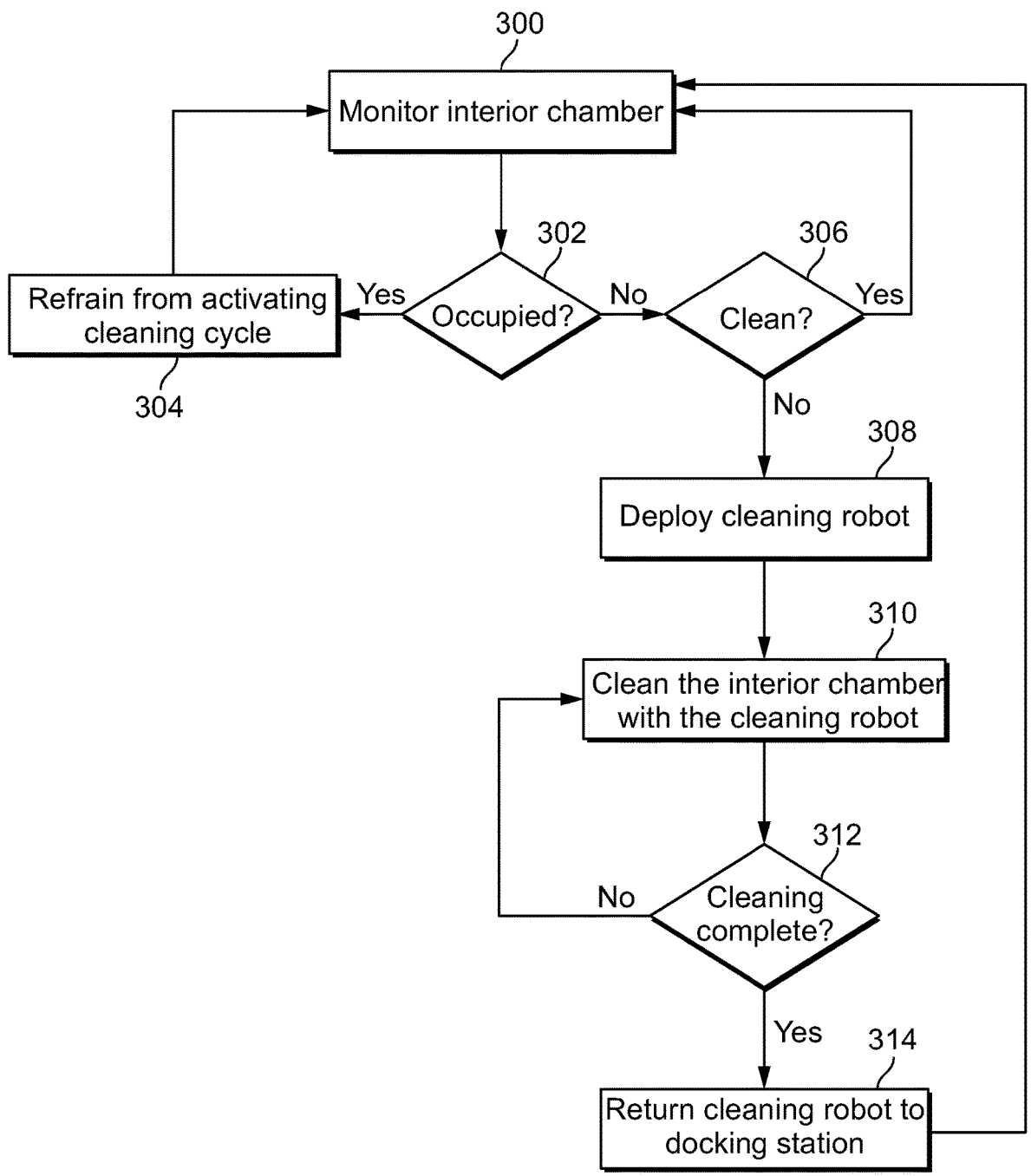
FIG. 6 illustrates a flow chart of a method of cleaning an interior chamber, according to an embodiment of the present disclosure.

FIG. 6 illustrates a flow chart of a method of cleaning an interior chamber, according to an embodiment of the present disclosure. Referring to FIGS. 3 and 6, the method begins at 300, in which an interior chamber (such as a lavatory onboard an aircraft) is monitored. For example, the control unit 140 may monitor the interior chamber 102 through received signals from the presence sensor 136. At 302, the control unit determines whether the interior chamber is occupied based on signals received from the presence sensor 136. If, at 302, it is determined that the interior chamber is occupied, the method proceeds to 304, in which the control unit refrains from activating the cleaning cycle. If, however, it is determined at 302 that the interior chamber 102 is unoccupied, the method proceeds to 306, in which the control unit 140 determines whether or not the interior chamber is clean.

The control unit 140 may determine whether or not the interior chamber 102 is clean based on a predetermined schedule, a time from last cleaning, a time in which the interior chamber was last occupied (based on a door to the interior chamber being opened and/or closed, for example), and/or the like. If the control unit 140 determines that the interior chamber is clean (or at least above a minimal cleanliness threshold, for example), the method returns to 300.

If, however, the control unit 140 determines that the interior chamber 102 needs cleaning, the method proceeds from 306 to 308, in which the cleaning robot 104 is deployed. At 310, the control unit 140 cleans the interior chamber with the cleaning robot 104. At 312, the control unit 140 determines whether the cleaning cycle is complete. For example, the control unit 140 may determine that the cleaning cycle is complete after the cleaning robot 104 has cleaned an entirety of a predetermined surface area (such as a floor) to be cleaned. If the cleaning cycle is not complete, the method returns to 310. If, however, the control unit 140 determines that the cleaning cycle is complete, the method proceeds from 312 to 314, in which the control unit 140 returns the cleaning robot to the docking station 106. The method then returns to 300.

Figure 7:
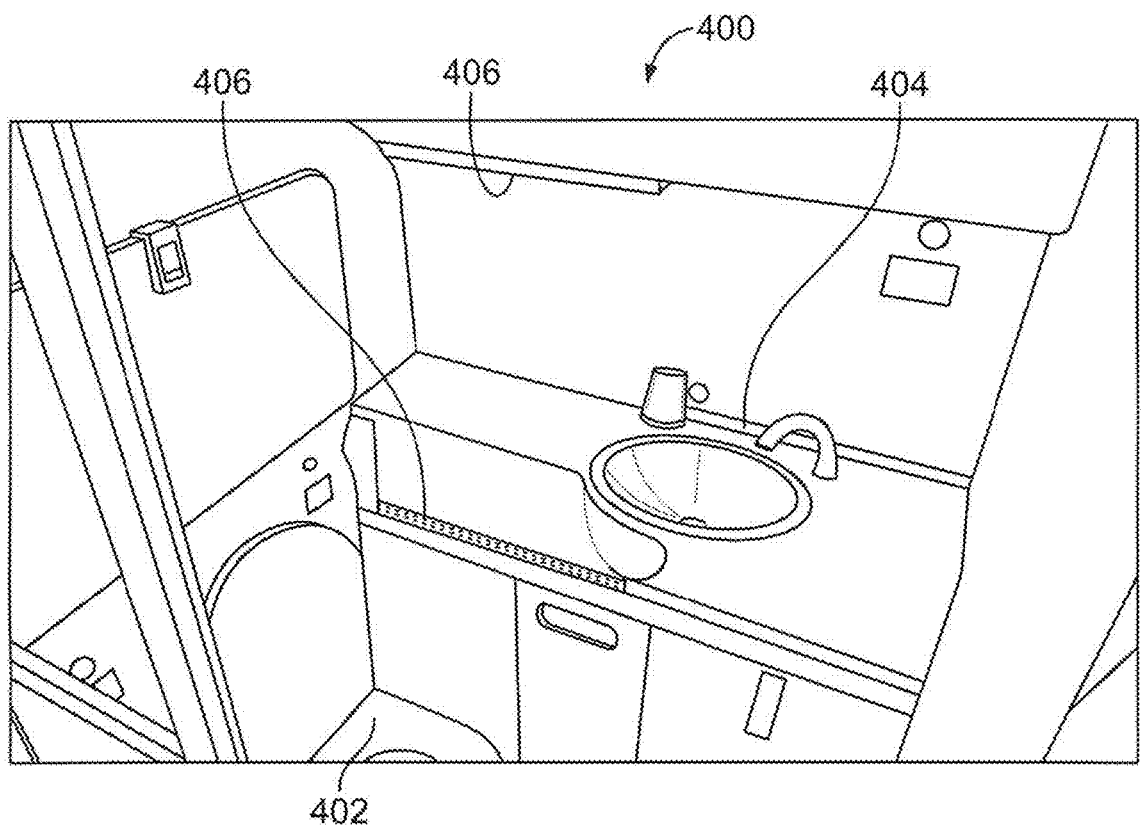
FIG. 7 illustrates a perspective top internal view of a lavatory, according to an embodiment of the present disclosure.

FIG. 7 illustrates a perspective top internal view of a lavatory 400, according to an embodiment of the present disclosure. The lavatory 400 is configured to be secured within a vehicle, such as an aircraft. The lavatory 400 includes a toilet 402, a sink 404, and one or more ultraviolet lights 406 that are configured to emit ultraviolet light into the lavatory 400 during a UV cleaning cycle when the lavatory 400 is unoccupied. The UV cleaning cycle may occur at the same time, or at a different time than the cleaning cycles described above. The lavatory 400 may also include an autonomous cleaning system, such as those described above.

Figure 8:
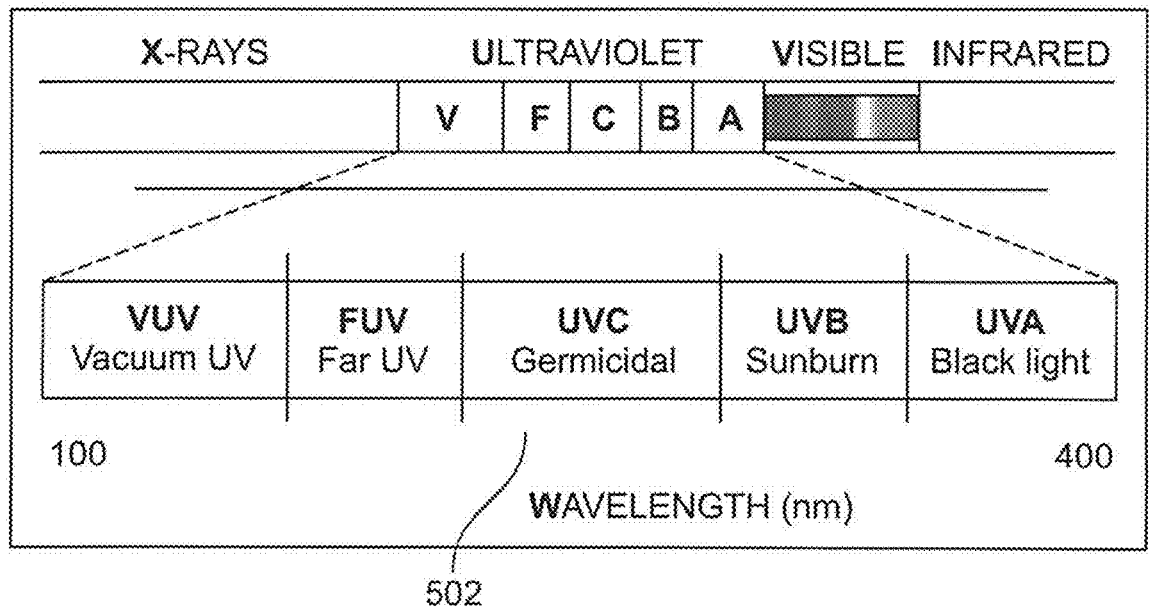
FIG. 8 illustrates a far ultraviolet spectrum.

FIG. 8 illustrates a far ultraviolet spectrum 500. Embodiments of the present disclosure may emit light within the far ultraviolet spectrum 500 to sanitize interior portions of a lavatory, for example. In particular, embodiments of the present disclosure may emit light within a germicidal UVC portion 502 of the spectrum 500. It has been found that by emitting UV light in the far ultraviolet spectrum 500, the ultraviolet lights of embodiments of the present disclosure provide cleaning cycles that are extremely fast and efficient (for example, lasting 2-3 seconds). Embodiments of the present disclosure provide ultraviolet cleaning systems and methods that are configured to sterilize surfaces within the lavatory within seconds.

Figure 9:
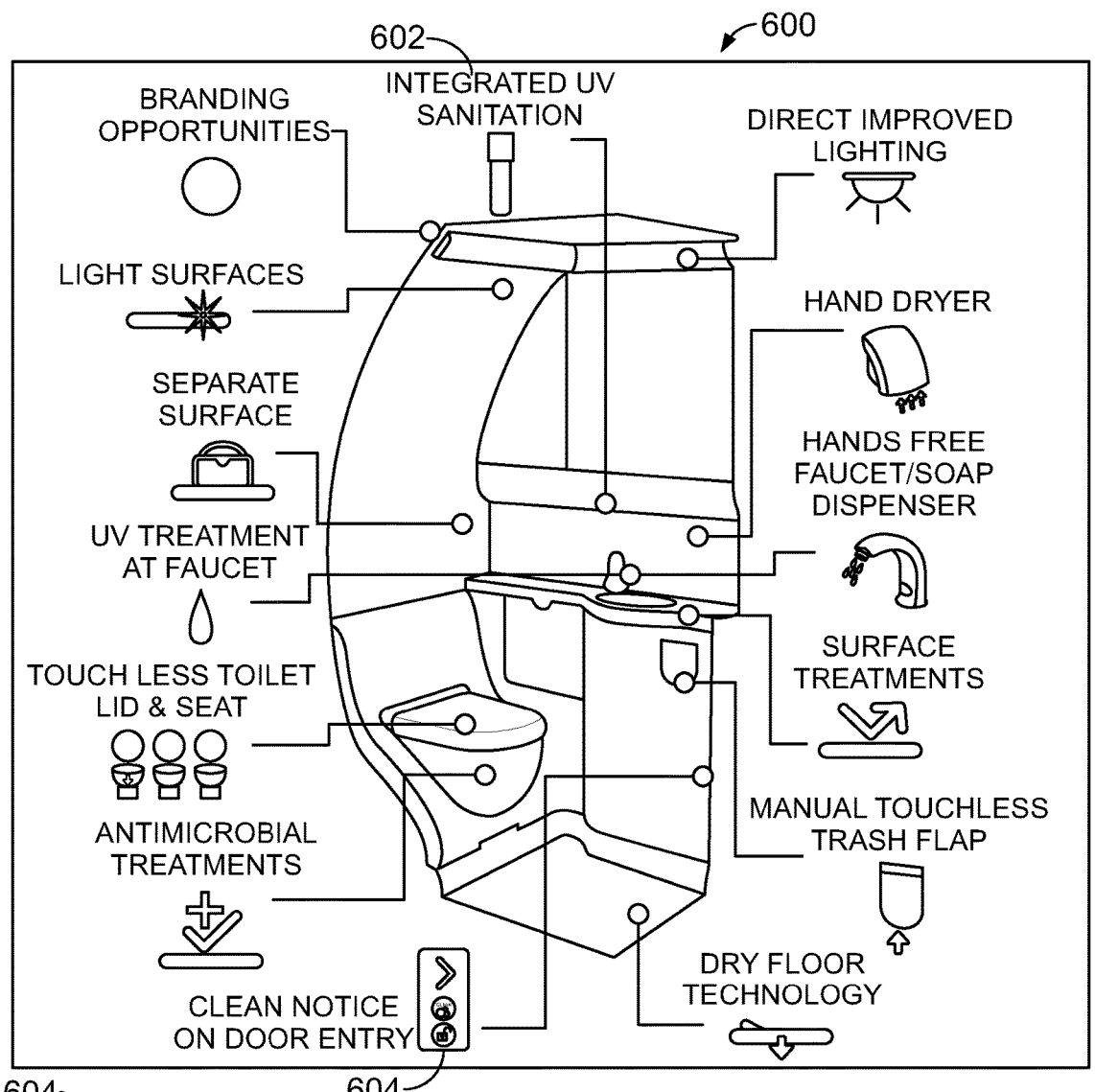
FIG. 9 illustrates a schematic interior view of a lavatory, according to an embodiment of the present disclosure.

FIG. 9 illustrates a schematic interior view of a lavatory 600, according to an embodiment of the present disclosure. The lavatory 600 may include an integrated far UV sanitation system 602, which may include one or more UV lights that are configured to emit light into the lavatory 600 during a cleaning cycle (such as when the lavatory is unoccupied). The lavatory 600 may also include an autonomous cleaning system, such as those described above.

A status indicator 604 may also be positioned on a door or frame of the lavatory 600. The status indicator 604 is configured to provide status information regarding a cleaning cycle (such as a UV cleaning cycle, and/or a cleaning cycle of an autonomous cleaning system). Various surfaces within the lavatory 600 may be coated or otherwise treated with antimicrobial materials, titanium dioxide, and/or the like. The autonomous cleaning system (such as any of those descried above) may be used and configured to clean and/or dry the floor of the lavatory 600.

Figure 10:
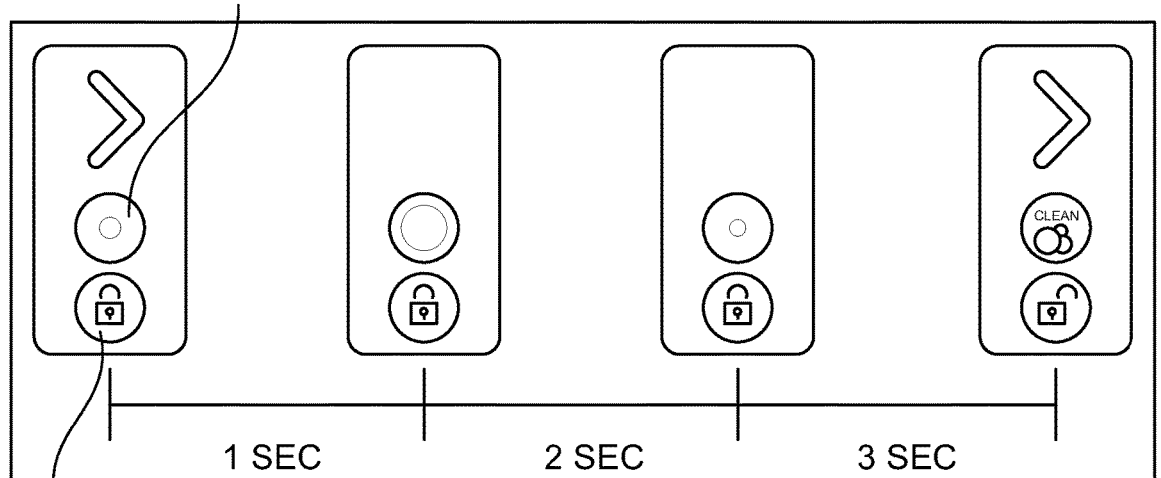
FIG. 10 illustrates a front view of a status indicator during a cleaning cycle, according to an embodiment of the present disclosure.

FIG. 10 illustrates a front view of the status indicator 604 during a cleaning cycle, according to an embodiment of the present disclosure. The status indicator 604 includes a cleaning status light 606 (such as one or more light emitting diodes) and a lock light 608 (such as one or more light emitting diodes). During a UV cleaning cycle, the cleaning status light 606 may change to indicate a cleaning spectrum (from unclean to clean, for example). During the cleaning cycle, the door of the lavatory may be locked, which is indicated by the lock light 608. After the cleaning cycle, the lock light 608 indicates that the door is unlocked. As shown in FIG. 10, the UV cleaning process may last just a few seconds. Optionally, the cleaning process may be shorter or longer than shown in FIG. 10.

As described above, embodiments of the present disclosure provide systems and methods for efficiently and effectively cleaning surfaces within interior chambers, such as lavatories. Embodiments of the present disclosure may optionally be used with various other interior chambers, whether onboard a vehicle or not. For example, embodiments of the present disclosure may be used to clean galley areas, door entry areas, and/or the like.

Embodiments of the present disclosure provide systems and methods that are configured to clean interior spaces, such as those of an aircraft. Embodiments of the present disclosure provide systems and methods that effectively and efficiently clean a lavatory onboard an aircraft, such as during a flight.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle comprising:
an internal cabin including a lavatory having a lavatory water supply and a waste disposal system;
a docking station within the lavatory; and
an autonomous cleaning system located within the lavatory of the internal cabin, wherein the autonomous cleaning system comprises a cleaning robot that cleans a portion of the lavatory,
wherein the cleaning robot is housed within the docking station, wherein the cleaning robot is deployed from the docking station during a cleaning cycle,
wherein the cleaning robot directly couples to the lavatory water supply and the waste disposal system when the cleaning robot is housed within the docking station.

2. The vehicle of claim 1, wherein the docking station comprises a charger that charges a battery of the cleaning robot when the cleaning robot is housed within the docking station.

3. The vehicle of claim 1, further comprising a presence sensor that detects a presence of an individual within the lavatory, wherein the cleaning robot is deployed to clean the portion of the lavatory when the lavatory is unoccupied.

4. The vehicle of claim 1, wherein the cleaning robot comprises a debris collector that collects debris from the lavatory during a cleaning cycle.

5. The vehicle of claim 1, wherein the cleaning robot comprises an agitator having a mechanical scrubber that agitates the portion of the lavatory during a cleaning cycle.

6. The vehicle of claim 1, wherein the cleaning robot comprises a dispenser in fluid communication with a fluid reservoir, wherein the dispenser dispenses fluid onto the portion of the lavatory during a cleaning cycle.

7. The vehicle of claim 6, wherein the cleaning robot comprises the fluid reservoir.

8. The vehicle of claim 1, wherein the cleaning robot comprises an ultraviolet light that irradiates the portion of the lavatory with ultraviolet light during a cleaning cycle.

9. The vehicle of claim 1, wherein the cleaning robot comprises a conveyance sub-system and a navigation sub-system, wherein the conveyance sub-system moves the cleaning robot within the lavatory based on signals received from the navigation sub-system.

10. A method, within a vehicle, of cleaning a lavatory of an internal cabin of the vehicle, the method comprising:
locating an autonomous cleaning system and a docking station within the lavatory of the internal cabin of the vehicle;
housing a cleaning robot of the autonomous cleaning system within the docking station before and after a cleaning cycle;
directly coupling the cleaning robot to a lavatory water supply and a waste disposal system of the lavatory when the cleaning robot is housed within the docking station;
deploying the cleaning robot from the docking station within the lavatory during the cleaning cycle; and
cleaning a portion of the lavatory with the cleaning robot during the cleaning cycle.

11. The method of claim 10, further comprising charging a battery of the cleaning robot within the docking station.

12. The method of claim 10, further comprising detecting a presence of an individual within the lavatory, and wherein the deploying and the cleaning cycle occur when the lavatory is unoccupied.

13. The method of claim 10, wherein the cleaning comprises collecting debris from the lavatory during the cleaning cycle.

14. The method of claim 10, wherein the cleaning comprises agitating the portion of the lavatory during the cleaning cycle.

15. The method of claim 10, wherein the cleaning comprises:
dispensing fluid onto the portion of the lavatory during the cleaning cycle;
irradiating the portion of the lavatory with ultraviolet light during the cleaning cycle; and
moving the cleaning robot within the lavatory based on signals received from a navigation sub-system.

16. A vehicle comprising:
an internal cabin including a lavatory having a lavatory water supply and a waste disposal system; and
an autonomous cleaning system located within a lavatory of the internal cabin, wherein the autonomous cleaning system comprises:
a cleaning robot that cleans a floor of the lavatory, wherein the cleaning robot includes: (a) a conveyance sub-system in communication with a navigation sub-system, wherein the conveyance sub-system moves the cleaning robot within the lavatory based on signals received from the navigation sub-system, (b) a debris collector that collects debris from the lavatory during a cleaning cycle, (c) an agitator that agitates a portion of the lavatory during the cleaning cycle, (d) a dispenser in fluid communication with a fluid reservoir, wherein the dispenser dispenses fluid onto the portion of the lavatory during the cleaning cycle, and (e) an ultraviolet light that irradiates the portion of the lavatory with ultraviolet light during the cleaning cycle;
a docking station within the lavatory, wherein the cleaning robot is housed within the docking station, wherein the cleaning robot is deployed from the docking station during the cleaning cycle, wherein the docking station comprises a charger that charges a battery of the cleaning robot when the cleaning robot is housed within the docking station, and wherein the cleaning robot directly couples to the lavatory water supply and the waste disposal system when the cleaning robot is housed within the docking station; and
a presence sensor that detects a presence of an individual within the lavatory, wherein the cleaning robot is deployed to clean the floor of the lavatory when the lavatory is unoccupied.

17. The vehicle of claim 1, wherein the cleaning robot comprises a dryer that dries the portion of the lavatory.

18. The vehicle of claim 3, wherein the presence sensor comprises a magnetic switch coupled to a door of the lavatory.

19. The vehicle of claim 1, wherein the cleaning robot is moveably secured to one or more tracks within the lavatory.

20. The vehicle of claim 19, wherein the one or more tracks are embedded within one or both of a floor or at least one wall of the lavatory.

21. The method of claim 12, wherein the detecting the presence comprises detecting the presence of the individual with a presence sensor including a magnetic switch coupled to a door of the lavatory.

22. The vehicle of claim 16, wherein the presence sensor comprises a magnetic switch coupled to a door of the lavatory.

* * * * *